July 9, 1957  HISAYOSHI KUBODERA  2,798,550
PELLETER

Filed May 29, 1953  3 Sheets-Sheet 1

INVENTOR.
HISAYOSHI KUBODERA
BY
ATTORNEY.

July 9, 1957  HISAYOSHI KUBODERA  2,798,550
PELLETER

Filed May 29, 1953  3 Sheets-Sheet 2

INVENTOR.
HISAYOSHI KUBODERA
BY
ATTORNEY.

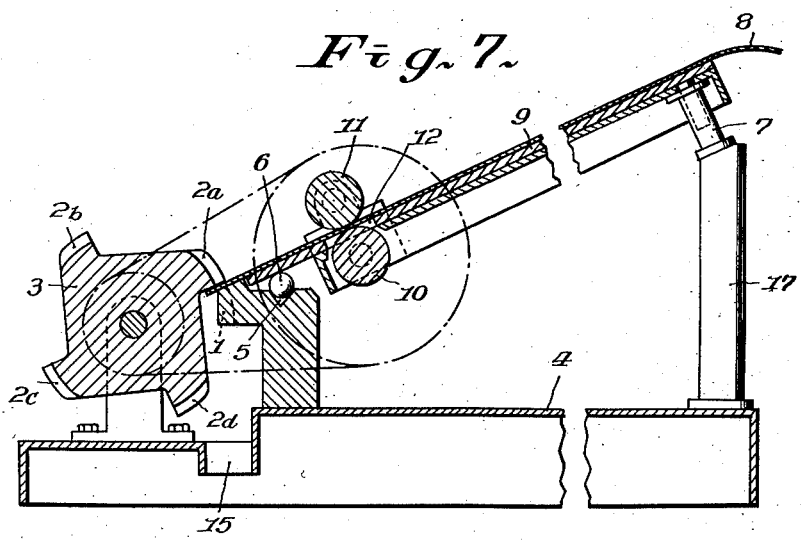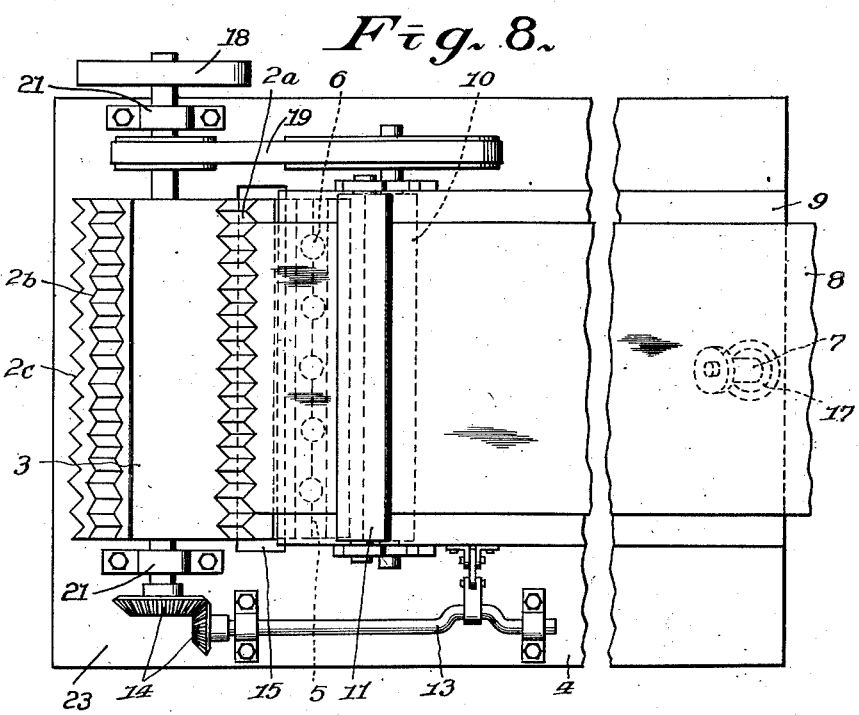

United States Patent Office 2,798,550
Patented July 9, 1957

2,798,550

PELLETER

Hisayoshi Kubodera, Ichigaya-Kaga-Cho, Shinjuku-ku, Tokyo-to, Japan

Application May 29, 1953, Serial No. 358,363

1 Claim. (Cl. 164—64)

This invention relates to an improved pelleter capable of cutting off, in continuous, accurate and economical manner, pieces of the same form and size from a plate of any material, for example, vinyl chloride. The former pelleters for cutting off pieces from a plate of vinyl chloride have various defects such as inequality of form and size of the cut pieces and production of wasteful chained pieces and powders of the raw material.

Therefore, an object of this invention is to provide a pelleter capable of cutting off uniform pieces of same form and size from a plate without production of wasteful chained pieces and powders.

The other object of this invention is to provide a pelleter capable of being modified by only the exchange of its toothed blades so that cut pieces of various form and size may be obtained.

According to this invention, said objects of this invention have been accomplished by the pelleter comprising two kinds of cutting toothed blades, the one of them being stationary and the other being movable relative to the former, and an apparatus capable of giving forward and sideward motion to the plate to be cut off into pieces.

Said objects and construction of this invention will be more clearly understood by reference to the following detailed description taken in connection with the examples illustrated in the accompanying drawings, wherein:

Fig. 7 is a vertically sectioned side view of another example of this invention.

Fig. 8 is a plan view of the example illustrated in Fig. 7.

In all figures, the same numerals indicate the same parts.

Figure 1:
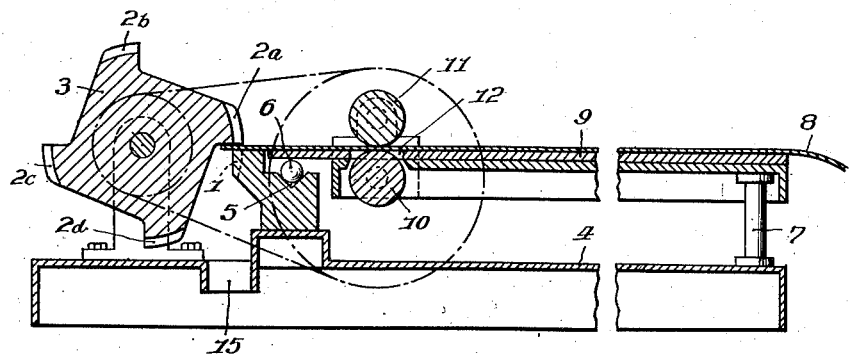
Fig. 1 is a vertically sectioned side view of an example of this invention.
Figure 2:
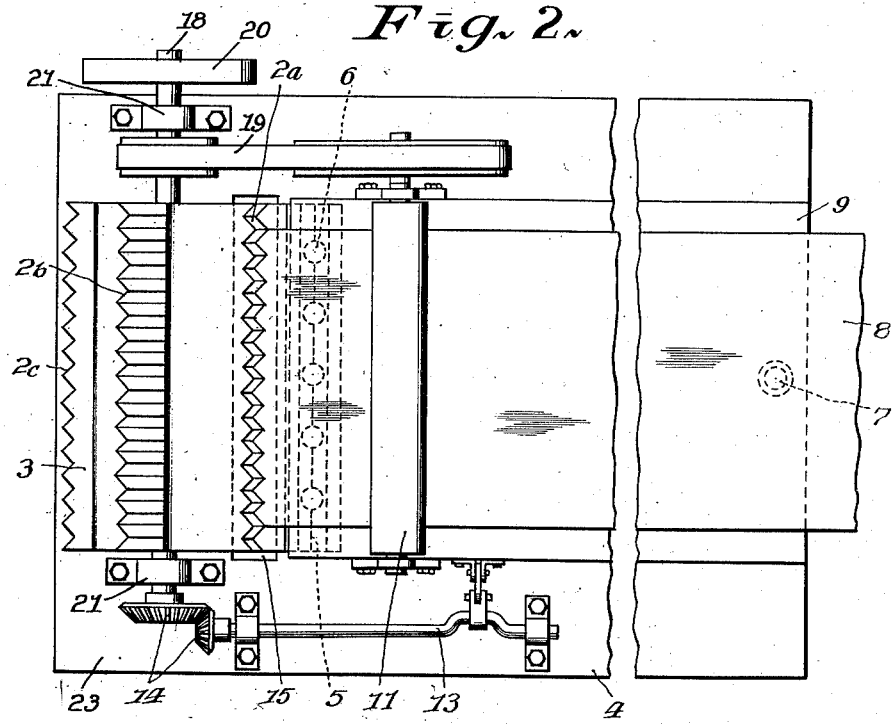
Fig. 2 is a plan view of the example illustrated in Fig. 1.

Referring to Figs. 1 and 2, on the circumferential surface of the revolving cylinder 3 are fixed four toothed blade 2a, 2b, 2c and 2d at equal intervals relative to each other. Another toothed blade 1 is supported stationarily on the base body 4 so that it may be able to mesh with each of said blades 2a, 2b, 2c and 2d when they come on the position of said blade 1. A table 9 is placed at the end portion thereof on several balls 6 arranged in a lateral slot 5 formed on said blade 1 and is pivoted at the rear part thereof on a supporter 7 mounted on said base body so that the end part of said table may be shifted to left and right sides. On said table is placed the work (such as a plate) to be cut off into pieces of desirable size and form.

Plate 8 may be of any material, for example, vinyl chloride. A pair of rollers 10, 11 is attached to the table 9 to advance said plate 8 towards the cutting blades, the roller 10 being projected out of opening 12 of the table 9 and driven by the driving shaft 18 of the cylinder 3 through a driving flexible belt 19 and the other roller 11 being pressed against the roller 10 by means of a spring not shown and self-weight thereof. Roller 11 may be driven through a suitable gearing. On side 23 of table 9 is fixed a crank 13 so that the table 9 may be reciprocated to the left and right sides one time per ¼ revolution of the cylinder 3, said crank being driven by the driving shaft 18 of the cylinder 3 through a bevel gear 14. For the purpose of collection of the cut pieces an opening 15 is made on the base body 4 at the position immediately below the stationary blade 1.

Figure 4:
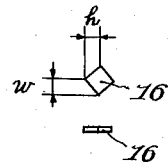
Fig. 4 shows plan and side views of a piece which has been cut off by the cutting blades illustrated in Fig. 3.
Figure 3:
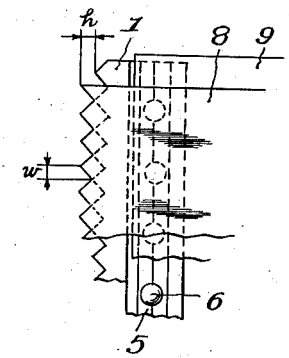
Fig. 3 is a partial view of Fig. 2.

In the example illustrated in Figs. 1 and 2, when the relative speed between the rollers 10, 11 and the revolving toothed blades is selected so that the plate 8 may be advanced forwards by a distance corresponding to tooth height $h$ of the revolving blade per ¼ rotation of said blades and at the same time with said advance the end portion of the plate 8 may be shifted sidewards by a distance corresponding to the half width $w$ of tooth pitch of the stationary toothed blade 4, said distances being shown clearly in Figs. 3 and 4, rectangular pieces 16 as shown in Fig. 4 will be cut off from the plate 8 due to meshing between the stationary toothed blade and the revolving toothed blades and drop into the opening 15.

Figure 6:
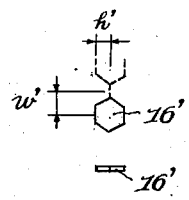
Fig. 6 shows plan and side views of a piece which has been cut off by the cutting blades illustrated in Fig. 5.
Figure 5:
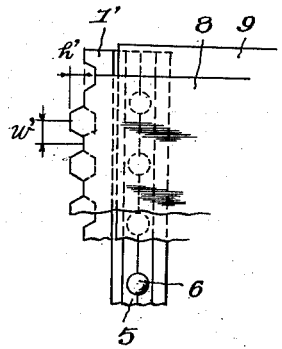
Fig. 5 is a partial view of other cutting blades capable of being used in the machine of this invention and being correspondent to the view of Fig. 3.

In the embodiment of the pelleter illustrated in Figs. 1 and 2, if toothed blades as indicted in Fig. 5 are used instead of the blades as indicated in Fig. 3 and relative speed between the rollers 10, 11 and the revolving blades is selected so that the plate 8 may be advanced forwards by a distance corresponding to tooth height $h'$ of the revolving blades per ¼ rotation of said blades and the end portion of the plate 8 may be shifted sidewards by a distance corresponding to the half width $w'$ of tooth pitch of the stationary blade 4, said distances being shown clearly in Figs. 5 and 6, hexagonal pieces 16' as shown in Fig. 6 will be cut off from the plate 8.

The example illustrated in Figs. 7 and 8 is the same in construction and operation as the example illustrated in Figs. 1 and 2 except that the table 9 is sloped downwards by supporting the pivotal supporter 7 on a pillar 17 stood on the base body 4.

According to the construction illustrated in Figs. 7 and 8, the length of the machine becomes short and stable movement of the plate 8 will be attained. Moreover, due to downwards shifting of the table caused by self-weight thereof, it would not swing even if there is any chattering gap at the supporting parts thereof, resulting in accurate advance of the table. Furthermore, cut pieces coming on the table due to spattering drop automatically along the slant surface of the table.

In the embodiment of this invention, the table 9 may be supported by balls at its rear position also instead of support by pivotal supporter 7. According to such support, the form and size of the cut pieces will become more uniform and also relatively large pieces as well as small pieces may be cut off effectively.

Furthermore, instead of revolving toothed blades another moving toothed blade which reciprocates vertically may be used with the same excellent result. Said reciprocation may be carried out by any suitable mechanism such as a crank device or a cam device.

According to the pelleter of this invention, as clear from the description as above, it has become possible to cut off pieces of uniform size and form from any kind of thick hard or soft plate with continuous, easy and accurate operation and also with good results. The cylinder 3 is driven by the driving shaft 18 supported in the bearing 21 attached to the base body 4. Shaft 18 mounted in bearing 21 is driven by a suitable driving motor, not shown, through a pulley 20 fixed on said shaft.

The machine of this invention may be applied for with equal excellent results in order to cut off pieces from any other soft plate as well as the plate of vinyl chloride.

As it is evident that many changes and modifications can be made in the above described details of this invention without departing from the nature and spirit of this invention, it is to be understood that this invention is not limited within the above description.

Having thus described my invention, I claim:

A pelleter capable of cutting off pieces of the same form and size from a raw plate made of any material such as vinyl chloride, which comprises a driving shaft, a base, means to drive said shaft, a stationary toothed blade having teeth corresponding in shape to a half of a hexagon, a revolving cylinder provided with at least one blade also having teeth corresponding in shape to a half of a hexagon on the periphery thereof, supported and driven by said shaft so that said latter blade may be brought at periodic intervals equal to the time for the raw plate to advance a predetermined distance equal to the height of the teeth into shearing relationship with said stationary blade, a table, anti-friction means projecting from said base and supporting the front portion of said table, a support on the rear portion of said base, said table being pivoted at the rear part thereof on said support so that said table may be shifted laterally to the left a predetermined distance relative to said base equal to one-half the pitch of the teeth during the first of said periodic intervals and to the right of said predetermined distance relative to said base during the second of said periodic intervals and alternately to the left and to the right thereafter, an interconnecting device composed of a gearing driven by said driving shaft and a crank connecting said gearing and one side of said table so that said table may be shifted laterally to the left and to the right at said periodic intervals the predetermined distance, and a pair of feeding rollers attached to said table so as to continually advance the raw plate put on said table towards said cutting blades at said predetermined rate, and a connecting device consisting of a set of pulleys and a belt whereby one of said rollers may be driven by said driving shaft.

References Cited in the file of this patent

UNITED STATES PATENTS

| | | |
|---|---|---|
| 578,385 | Bartlett | Mar. 9, 1897 |
| 823,672 | Dobbs et al. | June 19, 1906 |
| 1,249,707 | Zimmerman | Dec. 11, 1917 |
| 1,816,806 | Gangloff et al. | July 28, 1931 |
| 2,301,275 | Gross | Nov. 10, 1942 |

FOREIGN PATENTS

| | | |
|---|---|---|
| 503,042 | Belgium | May 31, 1951 |